July 5, 1927.  1,634,937
A. H. EDDY
ATTACHING MEANS FOR NAME PLATES AND OTHER ARTICLES
Filed Feb. 3, 1926
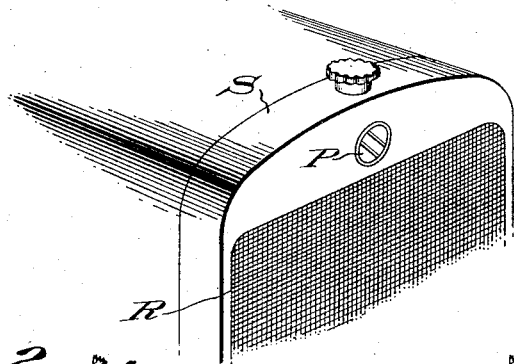
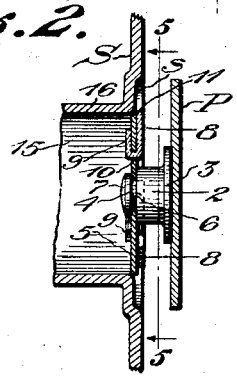
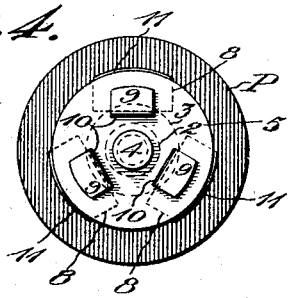
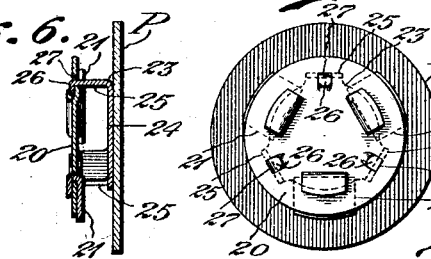
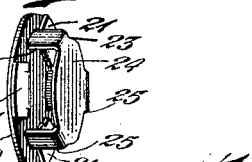
Inventor
Albert H. Eddy
By
Attorneys Patented July 5, 1927.

1,634,937

UNITED STATES PATENT OFFICE.

ALBERT H. EDDY, OF PAWTUCKET, RHODE ISLAND, ASSIGNOR TO A. L. NEWMAN COMPANY, OF CRANSTON, RHODE ISLAND, A CORPORATION OF RHODE ISLAND.

ATTACHING MEANS FOR NAME PLATES AND OTHER ARTICLES.

Application filed February 3, 1926. Serial No. 85,720.

This invention relates to improved means for attaching name-plates, emblems, medallions or other devices to any certain objects, particularly for attaching manufacturers' name-plates or insignia-bearing devices to the radiator shells of motor vehicles.

A principal object of the invention is to provide means whereby the name-plate or other device may be fastened securely in place on the front of the radiator shell or other structure by forcing its attaching means into a depression or orifice therein.

Another object of the invention is to provide an attaching means which will lock the name-plate or other device permanently in place on the shell or other structure to prevent its accidental release under jar or vibration, and also to prevent it from being pried off.

Another object of the invention is to provide an attaching means for the name-plate or other article which may be more readily and conveniently applied to use without requiring skill or expertness on the part of the workman or the use of tools.

Another object of the invention is to provide an attaching and locking means for the name-plate or other article which is simple in construction, more economical to manufacture and generally more efficient and durable in use.

Further objects of the improvement are set forth in the following specification which describes a preferred embodiment of the invention as illustrated by the accompanying drawings. In the drawings:

Fig. 1 is a perspective view of a portion of the hood of a motor vehicle showing a conventional form of name-plate or emblem applied to its radiator shell;

Fig. 2 is a vertical sectional view taken through the center of the radiator shell and illustrating the attaching means on the name-plate as being entered into the orifice in the shell;

Fig. 3 is a similar sectional view showing the name-plate seated in a recess on the front of the shell with the attaching means forced into the orifice thereof to lock the plate in position;

Fig. 4 is a view of the back of the name-plate or emblem showing the construction of the attaching means projecting therefrom;

Fig. 5 is a view of the attaching means looking in the opposite direction and part-sectional on the line 5—5 of Fig. 2;

Fig. 6 is a view similar to Fig. 2 showing a modification in the method of fastening the attaching means to the back of the name-plate or emblem;

Fig. 7 is a rearward view of the plate showing the modified structure of the attaching means; and Fig. 8 is a perspective view of the same.

The present invention consists in general in providing the name-plate or other article to be attached with an element adapted to be inserted into a depression or orifice in the radiator shell or other object, and having radial lugs or dogs arranged to rock or cant at an angle to the longitudinal walls of the orifice to grip the interior of the latter to lock the plate in place against the shell.

In Fig. 1 of the drawings S designates the sheet-metal shell or shield which encloses the top and sides of the cellular radiator-structure R on most types of motor vehicles, and to the front of which is generally attached a name-plate, medallion or other ornamental insignia-bearing device P. The name-plate or emblem P is usually constructed as a sheet-metal stamping which is embossed, enameled or otherwise ornamented on its face, and it is the preferred practice to attach these devices to the radiator shell without the use of solder, rivets, screws or other means necessitating mechanical operations before or after the shell has been assembled on the radiator. For this purpose various types of concavo-convex, coniform and irregularly-shaped deformable disks and rings have been employed, but most of these have not been found satisfactory to effect a positively-acting, secure and permanent means for attaching the plate. In the present improvement the attaching means is not dependent on the distortion or deformation of the locking element to provide the gripping action, but such action is mechanical and positive without liability of inherent weakness due to design or materials, or as induced by the shaping and forming operations.

As shown in the present drawings the name-plate or emblem P takes the form of a flat circular disk, but it may be of any other desired contour and in some cases of generally concavo-convex shape in cross-section. In some instances it may be held flat against the front of the radiator shell S, while in others it may be seated in a recess or depressions therein as illustrated most clearly in Fig. 3.

As one example of the invention a central spindle or stud 2 is secured to the back of the plate or emblem P, an enlarged head or flange 3 at one end of the stud being soldered, brazed or otherwise permanently joined to the plate. The opposite end of the stud 2 is reduced in diameter at 4 to adapt it to be inserted through an axial hole in a disk 5 which abuts the shoulder 6 on the stud. The end of the reduced portion 4 of the stud is headed over at 7 to rivet the disk fixedly in place thereon, or the disk may be fastened to the stud in any other suitable manner.

Secured to the side of the disk 5 facing the back of the plate P are a plurality of radial lugs or dogs 8 which act as the locking means for the plate P. As herein shown there are three lugs or dogs 8 mounted on the disk 5, but a greater number may be provided if desired. Each lug or dog 8 is of generally rectangular shape in outline and is provided with a narrowed extension or tab 9 adapted for insertion through a slit or opening 10 in the disk 5. The slits 10 are cut through the disk 5 at points equidistant from its axis and arranged at equal distances apart therearound. The tabs 9 on the dogs 8 are inserted through the slits 10 and bent over against the rearward face of the disk 5 to clamp the dogs tight against the reverse face thereof as shown in Fig. 2. The outer peripheral edges 11 of the dogs 8 are of arcuate contour and arranged concentric with the perimeter 12 of the disk 5, but projecting radially therebeyond. That is to say, the radius of the circular edges of the dogs 8 is somewhat greater than that of the disk 5. The general shape of the dogs is not material and may be varied as desired, and likewise the means for fastening the dogs to the mounting or disk 5 may be modified if desired.

The front of the radiator shell S is provided with an orifice 15, usually formed by flanging the metal inwardly in a cylindrical rim or annulus 16. The diameter of the disk 5 on the name-plate P is substantially equal to that of the interior of the flange or annulus 16 so that the disk may be slid thereinto. On the other hand, the radius of the curved edges of the dogs 8 being slightly greater than that of the disk 5 these elements will not enter freely into the orifice 15 in the radiator shell, but must be bent or canted back from the disk to force them into the opening. That is to say, as the disk 5 is pushed into the orifice 15 the peripheral edges 11 of the dogs 8 will engage against the interior of the annulus 16 to spring the dogs back in inclined relation to the disk as shown in Fig. 3. This action of the dogs requires that some little pressure be exerted on the front of the name-plate to force its attaching means into the orifice 15, thus effecting a relatively snug fit therebetween to secure a tight joinder of the name-plate with the radiator shell. Furthermore, and most important, the canting of the dogs 8 with respect to the disk 5 causes their sharp edges to frictionally engage or bite against the interior of the annulus 16 in such manner that the fastening means cannot be easily removed from the orifice in the radiator shell. Stated briefly, since the lugs 8 are canted or inclined outwardly toward the mouth of the orifice 15 any pressure tending to force the name-plate P away from the front of the shell S will only serve to more firmly grip the dogs against the interior of the orifice. It has therefore been found that with the construction shown and described it is utterly impossible to pry the name-plate off from the radiator shell without bending or breaking it away from its attaching means. Moreover, the joinder of the attaching means with the radiator shell is substantially permanent and secure against shock, jar or continuous vibration, the dogs acting to grip the interior of the orifice to prevent dislodgement of the name-plate under all conditions.

Figs. 6, 7 and 8 of the drawings illustrate a modified construction of the attaching means for the name-plate or other device. In this form of the invention the disk 20 on which the dogs 21 are mounted is attached to the plate P by means of a sheet-metal spider-member 23. This latter element may take the general shape of a washer or disk 24, adapted to be soldered, brazed, welded or otherwise fastened to the back of the name-plate P, and provided with bent-over legs or projections 25 having reduced portions or lugs 26 inserted through slits 27 in the main disk 20 and clinched or riveted over on the opposite side. This form of construction eliminates screw-machine or lathe work on the parts of the device and renders it more economical to manufacture with drop-press operations. At the same time, the fastening device is as staunch and rigid as with the construction first described and the gripping or dogging means operate with the same effectiveness to provide a secure and permanent bond between the name-plate or other article and the structure to which it is attached.

While I have herein illustrated and described the improved attaching device as applied to use for fastening name-plates or the like to radiator shells it is to be understood that the invention is susceptible of other uses with various types of articles. Likewise, the form and structure of the attaching means may be varied beyond the modification herein shown without departing from the spirit or scope of the invention. Therefore, without limiting myself in this respect, I claim:

1. Means for attaching a name-plate or other device to another object or structure having an orifice, comprising in combination with the name-plate or other device, a member fastened to the back thereof, and a plurality of radial dogs rockably connected to said member and having their peripheral edges radially disposed to resist their entrance into the orifice whereby to cause them to be canted back in inclined relation to frictionally grip the interior of the orifice.

2. Means for attaching an article to another object or structure having an orifice, comprising in combination with such article, an attaching element secured in spaced relation to the article and of peripheral dimension to adapt it to enter into the orifice, and radial dogs rockably connected to said element to adapt them to cant at an angle thereto, said dogs projecting beyond the perimeter of the attaching element to cause their outer edges to grip the interior of the orifice when they are forced thereinto and canted on the attaching element.

3. Means for attaching a name-plate or other article to another object or structure having an orifice, comprising in combination with the name-plate or other article, a disk secured to the back thereof in spaced relation thereto, and radial dogs rockably connected to the disk with their peripheral edges conforming to and projecting beyond the periphery thereof whereby when the disk is inserted into the orifice the dogs will be canted back at an angle thereto to cause their edges to frictionally grip the interior walls of the orifice.

4. Means for attaching a name-plate or other article to another object or structure having an orifice, comprising in combination with the name-plate or other article, a disk having apertures therein, a spider-member fastened to the back of the name-plate or other article and provided with legs secured at their ends to the disk to support it in spaced relation on the name-plate or other article, and radial dogs having portions inserted through the apertures in the disk to normally maintain them in abutting relation thereon with their outer edges projecting beyond the periphery of the disk and adapted to frictionally engage the interior of the orifice when the disk is entered thereinto.

5. Means for attaching a name-plate or other article to a radiator shell or structure having an orifice, comprising in combination with the name-plate or other article, a disk fastened to the back of the name-plate or other article in spaced relation thereto and provided with slits, and radial dogs formed with tabs inserted through the slits in the disk and clinched over on the back thereof to support the dogs in position to adapt their peripheral edges to frictionally engage the interior of the orifice in the shell or other structure when the disk is entered thereinto.

In testimony whereof I affix my signature.

ALBERT H. EDDY.

CERTIFICATE OF CORRECTION.

Patent No. 1,634,937.  Granted July 5, 1927, to

ALBERT H. EDDY.

It is hereby certified that error appears in the above numbered patent requiring correction as follows: In the grant and in the heading to the printed specification the residence of the patentee was erroneously written and printed as "Pawtucket, Rhode Island", whereas said residence should have been written and printed "Pawtuxet, Rhode Island"; and that the said Letters atent should be read with this correction therein that the same may conform , the record of the case in the Patent Office.

Signed and sealed this 13th day of September, A. D. 1927.

Seal.

M. J. Moore,
Acting Commissioner of Patents.